United States Patent
Mitsutake

(10) Patent No.: US 8,982,431 B2
(45) Date of Patent: Mar. 17, 2015

(54) ILLUMINATION APPARATUS AND IMAGE READING APPARATUS

(71) Applicant: Canon Kabushiki Kaisha, Tokyo (JP)

(72) Inventor: Ikutaro Mitsutake, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/970,318

(22) Filed: Aug. 19, 2013

(65) Prior Publication Data

US 2014/0055827 A1 Feb. 27, 2014

(30) Foreign Application Priority Data

Aug. 23, 2012 (JP) .................. 2012-184013

(51) Int. Cl.
 *H04N 1/04* (2006.01)
 *F21V 8/00* (2006.01)
 *H04N 1/028* (2006.01)

(52) U.S. Cl.
 CPC .......... *G02B 6/0091* (2013.01); *H04N 1/02835* (2013.01); *H04N 1/02855* (2013.01); *H04N 1/02865* (2013.01)
 USPC ............ 358/475; 358/484; 358/482; 358/483

(58) Field of Classification Search
 CPC ................ H04N 1/02815; H04N 2201/02831; H04N 1/028; H04N 1/193; H04N 2201/02884
 USPC ......... 358/484, 475, 482, 483, 474, 509, 505, 358/512–514; 250/208.1, 234–236, 239, 250/216; 355/67–70; 399/220, 221
 See application file for complete search history.

(56) References Cited

U.S. PATENT DOCUMENTS

| | | | | |
|---|---|---|---|---|
| 5,696,607 A | * | 12/1997 | Yamana et al. | 358/474 |
| 7,760,403 B2 | * | 7/2010 | Sakurai | 358/484 |
| 8,422,917 B2 | * | 4/2013 | Shinkawa | 399/200 |
| 8,437,050 B2 | * | 5/2013 | Tochigi et al. | 358/475 |

FOREIGN PATENT DOCUMENTS

| | | |
|---|---|---|
| JP | 2000-299765 A | 10/2000 |
| JP | 2001-077975 A | 3/2001 |
| JP | 2005-285702 A | 10/2005 |
| JP | 2010-063152 A | 3/2010 |
| JP | 4542954 B2 | 9/2010 |
| JP | 2010-277070 A | 12/2010 |
| JP | 2012-119900 A | 6/2012 |

* cited by examiner

*Primary Examiner* — Cheukfan Lee

(74) *Attorney, Agent, or Firm* — Canon USA Inc IP Division

(57) ABSTRACT

An illumination apparatus includes a light source, a light guide, and a holding member configured to hold the light source and to hold the light guide via a fixing member. Within a cross section including a plane normal direction of an exit surface of the light source and a plane normal direction of an entrance surface of the light guide, the plane normal direction of the entrance surface of the light guide or a direction within a surface of the light guide contacting the fixing member and the plane normal direction of the exit surface of the light source or a maximum intensity direction in light emission of the light source are inclined relative to each other such that a ray of light from the light source in the maximum intensity direction is refracted at the entrance surface of the light guide in a direction away from the fixing member.

8 Claims, 8 Drawing Sheets

MOLDING

MOLD OPENING

DEMOLDING

ILLUMINATION APPARATUS AND IMAGE READING APPARATUS

BACKGROUND OF THE INVENTION

1. Field of the Invention

The present disclosure relates to an illumination apparatus and an image reading apparatus using the same. The concepts disclosed herein are particularly suitable for an image scanner, a copying machine, and a facsimile machine.

2. Description of the Related Art

An image reading apparatus, such as an image scanner, a copying machine, and a facsimile machine, line-sequentially reads an image while illuminating the target surface of a document. Conventionally, a document illumination apparatus used in such an image reading apparatus illuminates the target surface of a document using a tubular (linear) light source, such as a fluorescent light. Recently, since the light emission use efficiency of a light emitting diode (LED) has been improved, an illumination apparatus that uses a plurality of LEDs instead of a linear light source has been developed.

When using a nearly point-shaped light source such as an LED, a plurality of LEDs is arranged in a main scanning direction (a longitudinal direction of a document) to optimize the light amount distribution and the light amount itself in the main scanning direction. Further, to efficiently guide light from the LEDs to a read area on a surface to be illuminated, a light guide that uses internal reflection and refraction is used.

In such a document illumination apparatus, it is necessary to accurately set the positional relationship between the maximum intensity direction in light emission angle of LEDs as a light source and an entrance surface of the light guide to improve the light use efficiency as much as possible. In U.S. Pat. No. 7,760,403, a substrate on which LEDs are mounted serves as a holding member that holds the LEDs and a light guider. Further, an area of the substrate, the area holding the light guide, is used as a reflection surface, thereby preventing the decrease in light use efficiency.

However, in U.S. Pat. No. 7,760,403, when the light guide is fixed onto a substrate with a fixing member such as a double-sided tape interposed therebetween, some of rays of light incident on an entrance surface of the light guide enter the fixing member. It is difficult to use a fixing member such as a double-sided tape as a reflection surface. Therefore, even if a white double-sided tape having a high reflectance is used, rays of light that have entered the fixing member are irregularly reflected, and the light use efficiency thereby decreases.

SUMMARY OF THE INVENTION

The present disclosure is directed to an illumination apparatus and an image reading apparatus capable of preventing a decrease in light use efficiency while maintaining the positional relationship between a light source and a light guide.

According to an aspect of the present disclosure, an illumination apparatus includes a light source, a light guide having an entrance surface on which a ray of light from the light source is incident and an exit surface from which a ray of light passing through the entrance surface exits toward a surface to be illuminated, and a holding member configured to hold the light source and to hold the light guide via a fixing member. Within a cross section including a plane normal direction of an exit surface of the light source and a plane normal direction of the entrance surface of the light guide, the plane normal direction of the entrance surface of the light guide or a direction within a surface of the light guide contacting the fixing member and the plane normal direction of the exit surface of the light source or a maximum intensity direction in light emission of the light source are inclined relative to each other such that a ray of light from the light source in the maximum intensity direction is refracted at the entrance surface of the light guide in a direction away from the fixing member.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
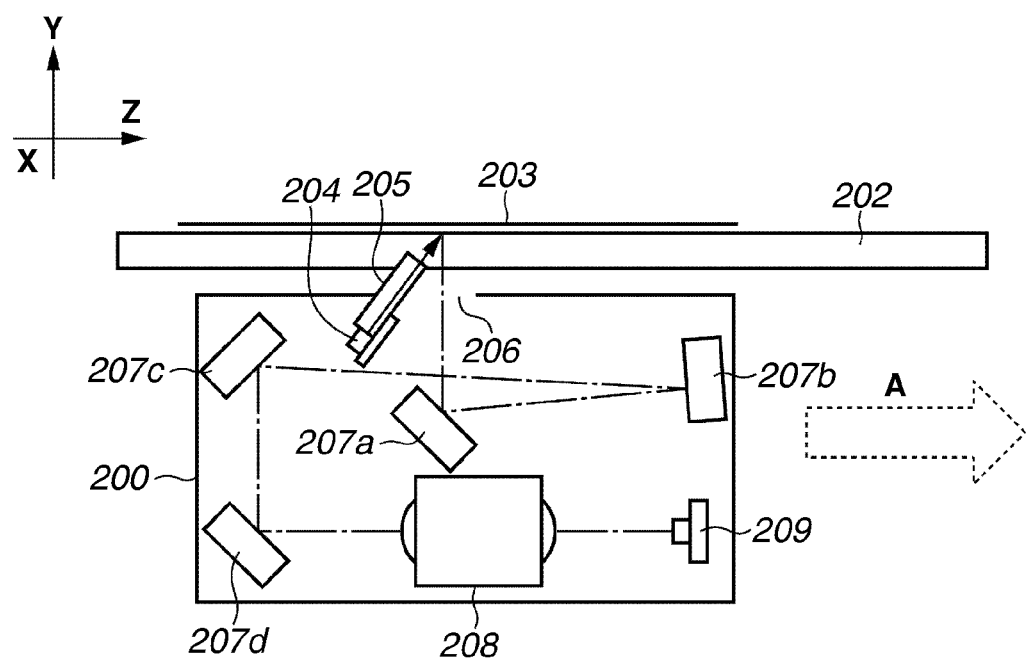
FIG. 1 is a diagram illustrating an image reading apparatus equipped with an illumination apparatus.

FIG. 1 is a diagram illustrating an image reading apparatus equipped with an illumination apparatus according to a first exemplary embodiment. The image reading apparatus is provided with a carriage 200 and a document positioning plate 202. The carriage 200 integrally holds a light source 204, a light guide 205, and an imaging optical system 208. The document positioning plate 202 is made of glass, and a document 203 is laid thereon. In the image reading apparatus, the carriage 200 moves in a sub scanning direction, which is indicated by arrow A in FIG. 1, with respect to the document 203 laid on the document positioning plate 202 to read image information of the document 203. The thus read image information is transmitted to an image processing unit located inside the apparatus or an external device such as a personal computer via an interface (not illustrated).

Alternatively, the document 203 may be moved with respect to the carriage 200 to read image information of the document 203.

In the carriage 200, an illumination apparatus including the light source 204 and the light guide 205 illuminates a read area on the document 203 from the vicinity of a read window 206, which is provided in the carriage 200. Further, the imaging optical system 208 collects reflected light or scattered light from the document 203 on a line sensor (light receiving unit) 209 via the read window 206 and folding mirrors 207a to 207d.

Figure 2A:
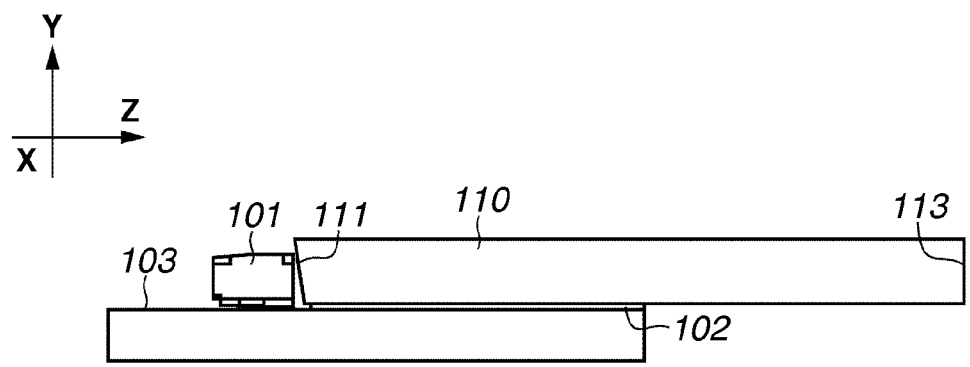
FIG. 2A is a schematic configuration diagram of the illumination apparatus according to the first exemplary embodiment.

A light source 101 illustrated in FIG. 2A includes a plurality of LEDs, which is arranged in the X direction (main scanning direction). The light source 101 illuminates a linear read area (not illustrated), elongated in the X direction, via a light guide 110. The light guide 110 is provided with an entrance surface 111, which faces the light source 101. The light guide 110 transmits and internally reflects (totally reflects) light from the light source 101 to direct the light to an exit surface 113. Then, the read area is illuminated directly from the exit surface 113 or via a reflection mirror and the like.

The light source 101 is mounted on and held by the substrate 103. The light guide 110 is made of an acrylic resin, and is fixed onto the substrate 103 via a fixing member 102 (a white double-sided tape in the present exemplary embodiment) interposed therebetween. In other words, the substrate 103 as a holding member integrally holds the light source 101 and the light guide 110.

Figure 8:
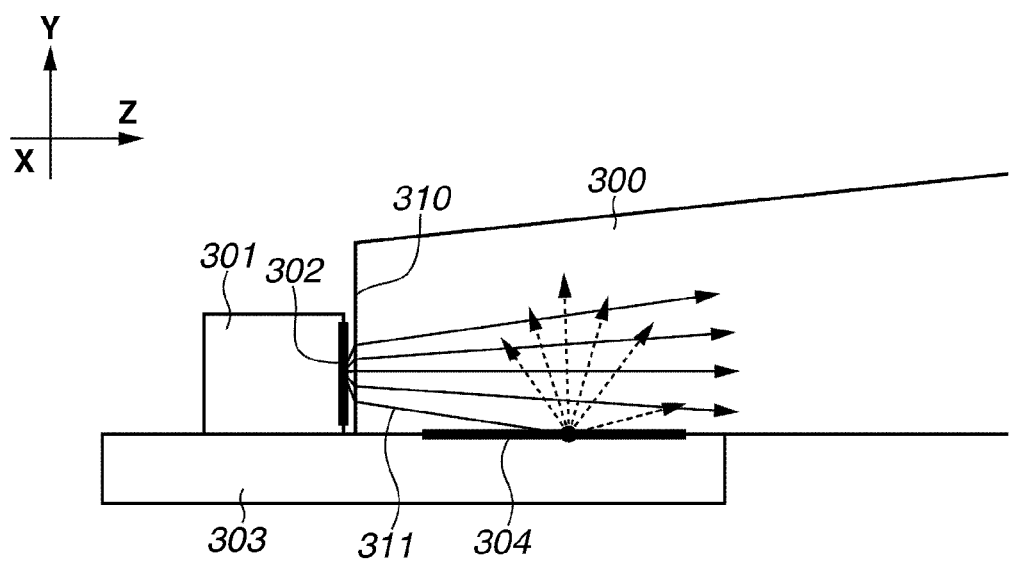
FIG. 8 is a ray tracing diagram in a light guide of a conventional illumination apparatus.

A light source 301, which is an LED having an exit surface 302 perpendicular to a substrate 303 as illustrated in FIG. 8, is called a side view LED. A side view LED is used as a light source in a variety of fields such as a backlight of a liquid crystal display. A side view LED is also used in exemplary embodiments described below. Generally, the LED emits light from the exit surface 302 according to Lambert's law, that is, emits light so that luminance is even regardless of the angle of view. The LED widely emits rays of light within the range of ±90° from a normal direction of the exit surface 302 while taking the maximum intensity of light in the normal direction of the exit surface 302.

To configure an efficient illumination apparatus by using such a side view LED light source 301 and the light guide 300, it is necessary to place the light guide 300 and the light source 301 to prevent the deviation of the relative positions thereof. Therefore, to effectively position the side view LED light source 301 and the light guide 300, the substrate 303 on which the light source 301 is mounted is attached or bonded to the vicinity of the entrance surface 310 of the light guide 300.

However, in such a configuration, some of rays of light that have been emitted from the light source 301 and have then entered the entrance surface 310 of the light guide 300 travel toward a fixing member 304, which fixes the light guide 300 thereon.

Since a double-sided tape or adhesive is generally used as the fixing member 304, there is no interface space between the fixing member 304 and the light guide 300. As a result, conditions for total reflection in the interface become strict. More specifically, an incident angle required for total reflection becomes large. Therefore, in the conventional configuration as illustrated in FIG. 8, rays of light that have not been totally reflected are absorbed or scattered at the fixing member 304. As a result, rays of light that are directed to an area to be illuminated (read area) are reduced, and the light use efficiency is thereby lowered.

Figure 2B:
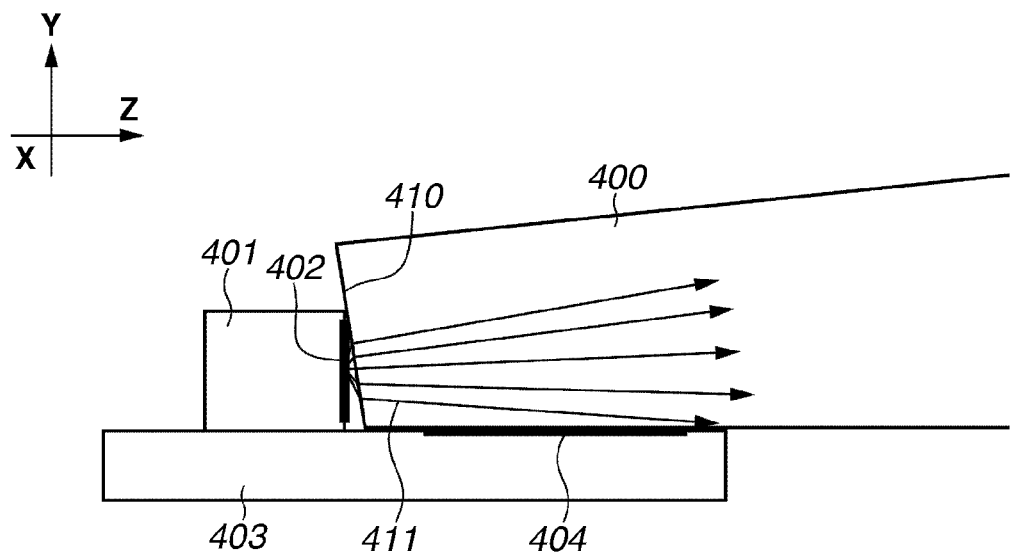
FIG. 2B is a ray tracing diagram in a light guide of the illumination apparatus according to the first exemplary embodiment in which the amount of light entering a fixing member is reduced.

In view of this, in the illumination apparatus according to the present exemplary embodiment, an entrance surface 410 of a light guide 400 is inclined within a YZ cross section as illustrated in FIG. 2B. The YZ cross section includes a plane normal direction of an exit surface 402 of a light source 401 and a plane normal direction of the entrance surface 410 of the light guide 400. Specifically, within the YZ cross section, the normal direction of the entrance surface 410 of the light guide 400 is inclined relative to the normal direction of the exit surface 402 of the light source 401 such that a ray of light from the light source 401 in a maximum intensity direction is refracted at the entrance surface 410 of the light guide 400 in a direction away from a fixing member 404. The maximum intensity direction indicates a direction in which a ray of light having the maximum intensity travels among light emission angles of rays of light emitted from the light source 401. In other words, the entrance surface 410 of the light guide 400 is inclined in a direction that allows a ray of light in the maximum intensity direction, the ray having entered the entrance surface 410, to travel by refraction in a direction away from the fixing member 404 such as a double-sided tape. Therefore, an angle formed between a surface of the light guide 400 contacting the fixing member 404 and the entrance surface 410 thereof is an obtuse angle. As a result, since rays of light that travel toward the fixing member 404 are reduced, it is possible to prevent a decrease in light use efficiency of illumination.

Figure 3:
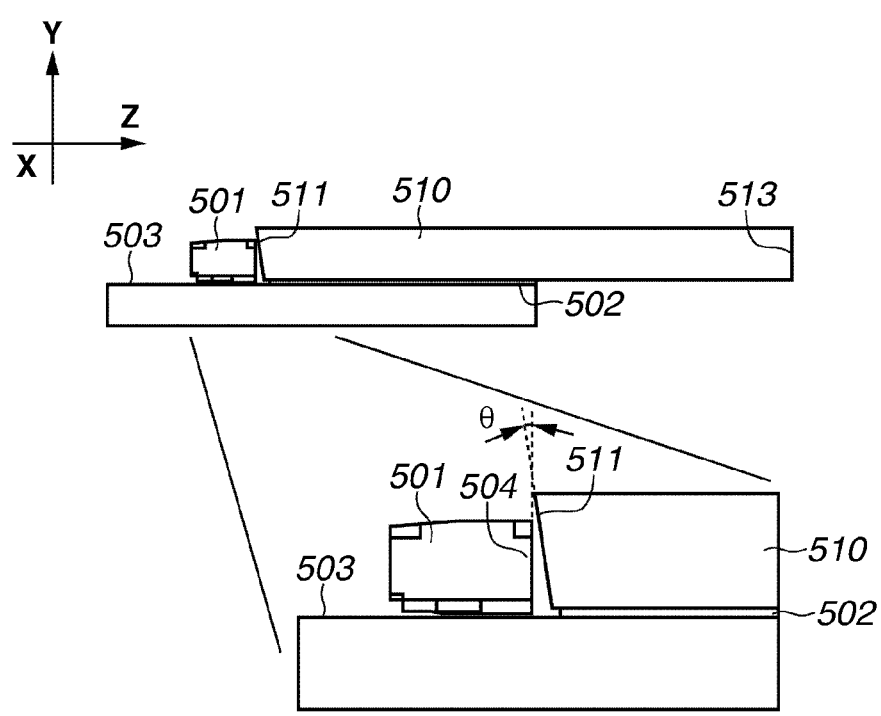
FIG. 3 is a schematic configuration diagram of an illumination apparatus when changing an inclination angle θ of an entrance surface of a light guide.

Hereinbelow, an effect caused by the inclination of an entrance surface will be described. The effect is estimated by performing a simulation of the total amount of rays of light emitted from an exit surface 513 of a light guide 510. The simulation is performed by changing an inclination angle θ of an entrance surface 511 of the light guide 510 with respect to an exit surface 504 of an LED light source 501 within the range of −8° to 8°, as illustrated in FIG. 3. The exit surface 504 of the LED light source 501 has a generally rectangular shape of 2 mm in width (X direction) and 0.5 mm in height (Y direction). The light guide 510 is made of an acrylic resin and has a rectangular parallelepiped shape of 1 mm in thickness (Y direction) and approximately 10 mm in length (Z direction).

A substrate 503 is a flat plate having a thickness (Y direction) of 1 mm. The reflectance of the substrate 503 is assumed to be 0%, that is, the substrate 503 is assumed to be an absorbing member. Further, a white double-sided tape having a thickness (Y direction) of 0.05 mm and a width (Z direction) of 5 mm is used as a fixing member 502. The calculation is performed under conditions in which rays of light are scattered according to Lambert's law in the reflection by the fixing member 502 and the reflectance is 50%, 70%, and 90%.

Figure 4:
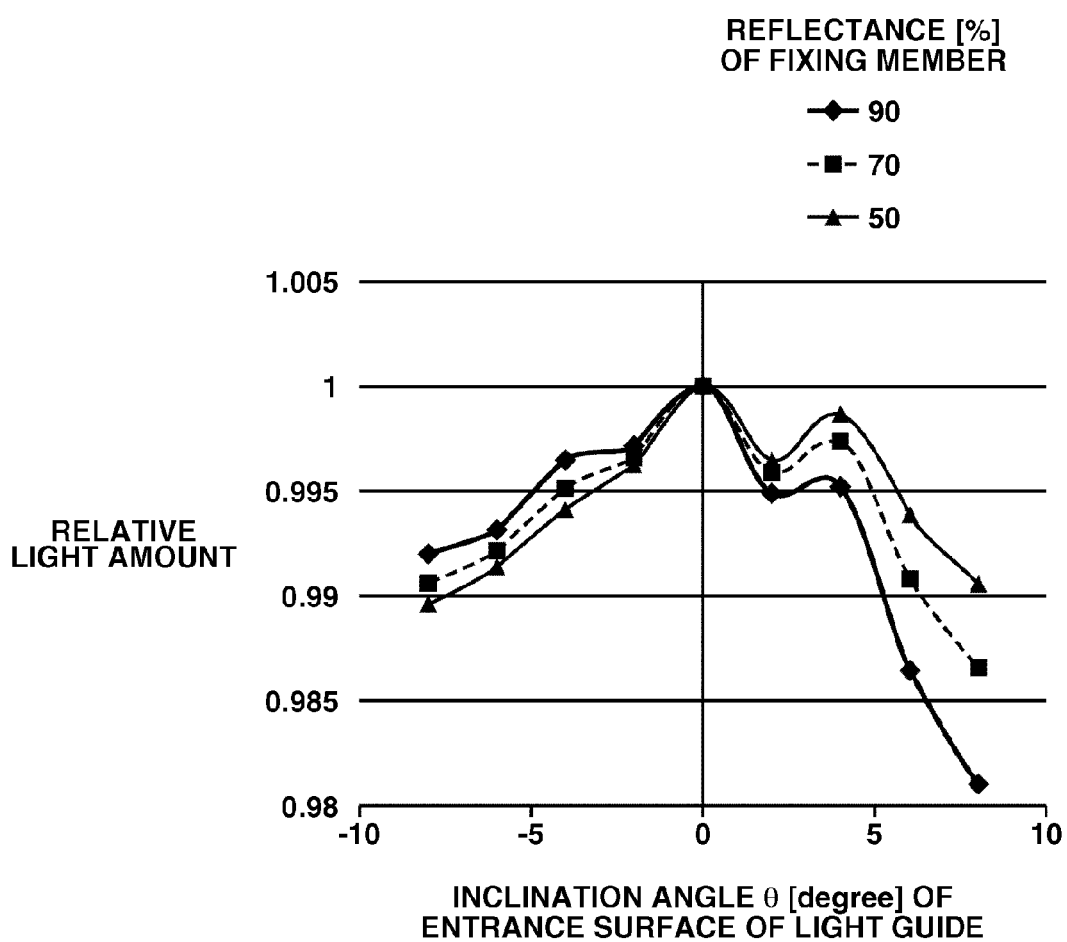
FIG. 4 is a diagram illustrating the relative light amount when changing an inclination angle θ of an entrance surface of the light guide.

FIG. 4 illustrates the calculation results under the above conditions. In FIG. 4, normalization is performed with the amount of light on an exit surface of a light guide when the inclination angle θ is 0°, that is, when an exit surface of an LED light source directly faces an entrance surface of the light guide. When the exit surface 504 of the LED light source 501 directly faces the entrance surface 511 of the light guide 510, a direction in which the entrance surface 511 of the light guide 510 rotates in a counterclockwise direction is defined as plus (+), and a direction in which the entrance surface 511 of the light guide 510 rotates in a clockwise direction is defined as minus (−).

FIG. 4 illustrates that, when the entrance surface 511 of the light guide 510 rotates in the clockwise direction, the amount of illumination light substantially uniformly decreases. On the other hand, when the entrance surface 511 of the light guide 510 rotates in the counterclockwise direction, the amount of illumination light that has once decreased tends to increase again. This is because rays of light from the LED light source 501 are refracted at the entrance surface 511 of the light guide 510 in the Z+ direction, and rays of light that travel toward the fixing member 502 having a scattering or absorption effect is, therefore, reduced.

When the entrance surface 511 continues to rotate in the counterclockwise direction, the amount of light decreases in the same manner as in the case of the clockwise rotation. This is because a gap between the exit surface 504 of the LED light source 501 and the entrance surface 511 of the light guide 510 expands, and rays of light leak through the gap.

The above result shows that the light use efficiency of illumination becomes maximum when the normal line of an exit surface of an LED light source and the normal line of an entrance surface of a light guide are parallel to each other. However, when manufacturing the light guide by injection molding, such a condition is not desirable due to the structure of a mold. More specifically, when the normal line of an exit surface of an LED light source and the normal line of an entrance surface of a light guide are parallel to each other, the entrance surface of the light guide and a bottom surface of a light guide portion (a surface facing the fixing member) thereof become perpendicular to each other. However, such a condition is not desirable in injection molding.

Figure 5:
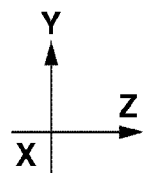
FIG. 5 is a diagram illustrating a method for forming the light guide according to the first exemplary embodiment.
Figure 5:
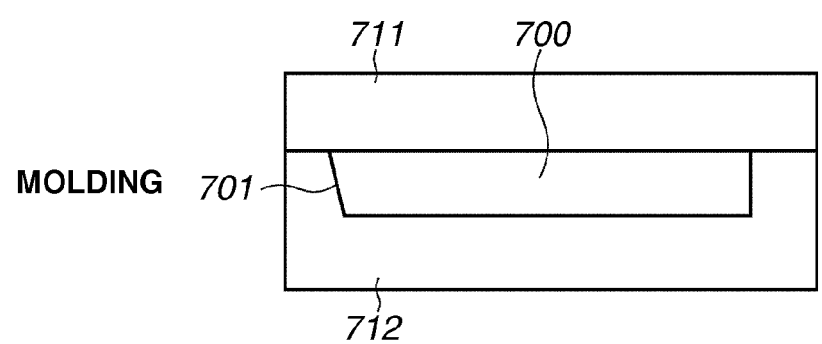
Figure 5:
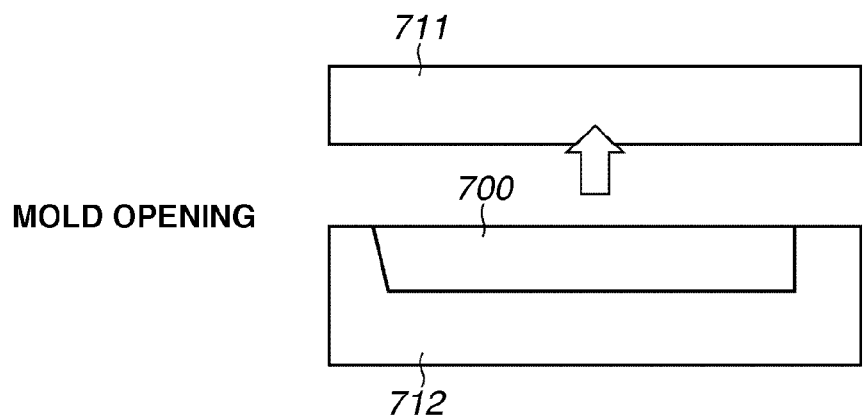
Figure 5:
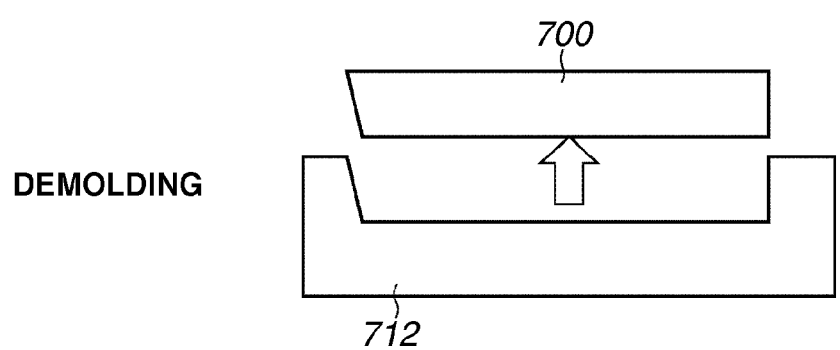

The reason of the above is as follows. A component such as a light guide used in an image illumination apparatus is long in the main scanning direction (X direction) and short in the Y direction (thickness direction) with respect to the Z direction. When manufacturing such a component by injection molding, a mold is generally designed in such a manner that the molded component is removed from the mold in the Y direction as illustrated in FIG. 5. In such a mold structure, it is effective to have a slope called a draft angle in an entrance surface 701, that is, form the light guide surface and the entrance surface 701 so as not to be perpendicular to each other. The draft angle is formed to prevent the entrance surface 701 from getting stuck on the mold, which may cause abnormality in the shape of the molded light source, when removing the molded light guide from the mold.

The draft angle is known to be generally approximately 1° to 3°. However, the present exemplary embodiment is characterized in that the direction of the draft angle is defined as a direction in which the incident light travels away from the fixing member by refraction, and the draft angle is 3° or more, which is larger than the conventional one. More specifically, to improve the light use efficiency while preventing the occurrence of abnormality in the shape of the molded light guide in demolding, although depending on the reflectance of the fixing member, the entrance surface of the light guide is inclined by approximately 3° to 5° in the counterclockwise direction in FIG. 3.

Figure 6:
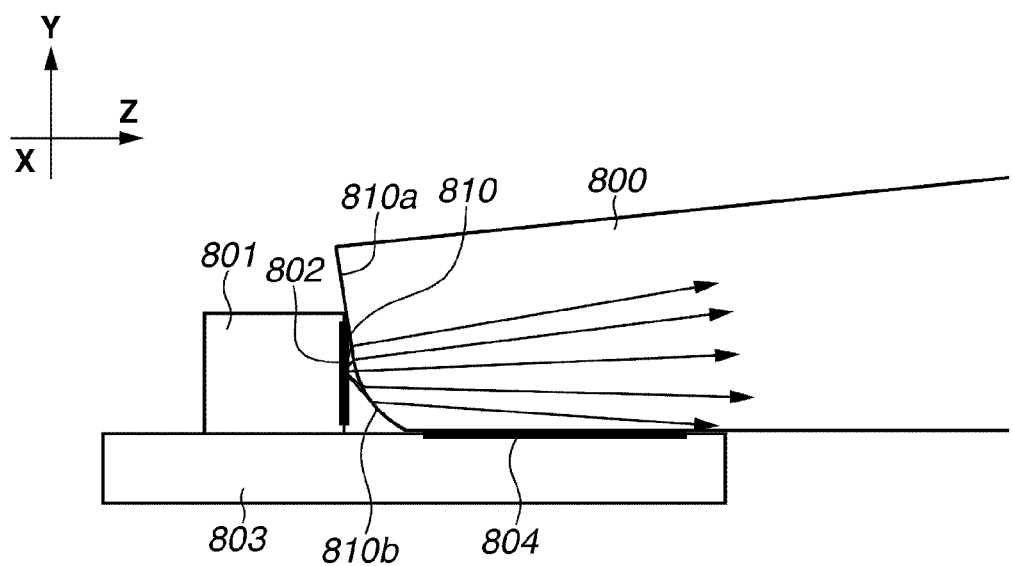
FIG. 6 is a ray tracing diagram in a light guide of an illumination apparatus.

An illumination apparatus according to a second exemplary embodiment will be described with reference to FIG. 6. In the illumination apparatus of the present exemplary embodiment, a part of the entrance surface of the light guide of the first exemplary embodiment is formed to have an arc cross section. More specifically, an upper portion 810a (a first portion) of an entrance surface 810, the upper portion 810a being positioned far from a fixing member 804, is formed into a flat surface. Further, the normal line of the upper portion 810a is inclined in a direction in which the incident light travels away from the fixing member 804 by refraction. On the other hand, a lower portion 810b (a second portion) of the entrance surface 810, the lower portion 810b being positioned near the fixing member 804, is formed into a curved surface. In the curved surface, the angle of the normal line continuously changes, and the inclination thereof with respect to the maximum intensity direction in light emission angle of a light source 801 becomes larger.

Rays of light passing through the lower portion 810b of the entrance surface 810 of a light guide 800 are likely to travel toward the fixing member 804. However, in the present exemplary embodiment, rays of light passing through the lower portion 810b can be refracted in the Z+direction. As a result, it is possible to improve the light use efficiency of illumination. In addition, since there are less sharp portions in the light guide 800, it is possible to further reduce the occurrence of the light guide 800 getting stuck in demolding. As a result, the shape abnormality is not likely to occur.

An illumination apparatus according to a third exemplary embodiment will be described with reference to FIG. 7. In the illumination apparatus of the present exemplary embodiment, a light guide 900 having the same shape as that of the light guide of the first exemplary embodiment is used. In addition, an exit surface 902 of an LED light source 901 is arranged in parallel to an entrance surface 910 of the light guide 900. More specifically, within the YZ cross section, a plane normal direction of the exit surface 902 of the light source 901 or the maximum intensity direction in light emission angle is inclined with respect to a direction within a surface of the light guide 900 contacting a fixing member 904 (Z direction). The normal direction of the exit surface 902 and the normal direction of the entrance surface 910 are the same as each other.

When the entrance surface 910 of the light guide 900 is inclined, a gap is generated between the exit surface 902 of the LED light source 901 and the entrance surface 910 of the light guide 900. However, in the present exemplary embodiment, it is possible to make the gap smaller, thereby improving the light use efficiency of illumination. In the present exemplary embodiment, a substrate 903 which is bent to be turn down at both ends thereof is used to allow rays of light to enter the entrance surface 910 so that the rays travel in a direction away from the fixing member 904. In addition, the gap between the exit surface 902 of the LED light source 901 and the entrance surface 910 of the light guide 900 is made smaller.

Although the exemplary embodiments of the present invention have been described, the present invention is not limited thereto. Various modifications can be made as described below.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In the above exemplary embodiments, distances between respective LEDs which are formed in the main scanning direction (longitudinal direction) maybe equal to each other. The LEDs may also be more closely arranged, namely, arranged to have a smaller distance, at both ends of the light source than at the center thereof in the longitudinal direction. Alternatively, the LEDs may also be provided only at the ends of the light source in the longitudinal direction.

Figure 7:
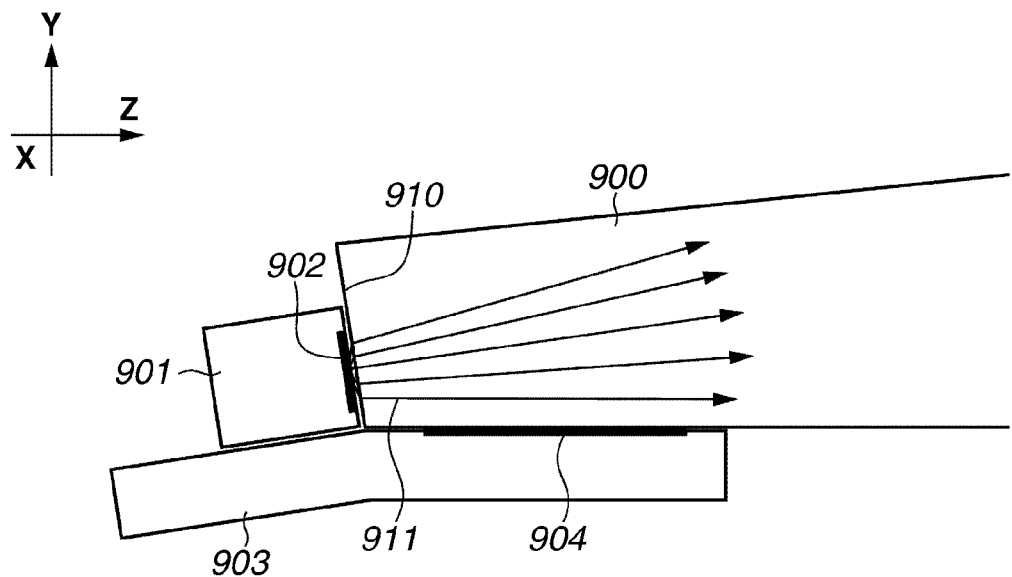
FIG. 7 is a ray tracing diagram in a light guide of an illumination apparatus.

In FIG. 7, the light guide 900 may be replaced with the conventional light guide 300 illustrated in FIG. 8. In this case, the plane normal direction of the entrance surface 310 of the light guide 300 is inclined relative to the plane normal direction of the exit surface 902 of the light source 901 (or, the maximum intensity direction in light emission angle).

Alternatively, in FIG. 7, a light source that emits light in a direction away from the fixing member may be used in combination with the conventional plate-like substrate 303.

Further, in FIG. 2B, a medium having a higher refractive index than the light guide 400 may be interposed between the exit surface 402 of the light source 401 and the entrance surface 410 of the light guide 400 so that the entrance surface 410 is inclined not from bottom right to top left, but from bottom left to top right.

This application claims the benefit of Japanese Patent Application No. 2012-184013 filed Aug. 23, 2012, which is hereby incorporated by reference herein in its entirety.

What is claimed is:

1. An illumination apparatus comprising:
   a light source;
   a light guide having an entrance surface on which a ray of light from the light source is incident and an exit surface from which a ray of light passing through the entrance surface exits toward a surface to be illuminated; and
   a holding member configured to hold the light source and to hold the light guide via a fixing member,
   wherein an exit surface of the light source is perpendicular to a surface of the holding member contacting the light source, and
   wherein, within a cross section including a plane normal direction of the exit surface of the light source and a plane normal direction of the entrance surface of the light guide, the plane normal direction of the entrance surface of the light guide or a direction within a surface of the light guide contacting the fixing member and the plane normal direction of the exit surface of the light source or a maximum intensity direction in light emission of the light source are inclined relative to each other such that a ray of light from the light source in the maximum intensity direction is refracted at the entrance surface of the light guide in a direction away from the fixing member.

2. The illumination apparatus according to claim 1, wherein the plane normal direction of the entrance surface of the light guide and the plane normal direction of the exit surface of the light source are inclined relative to each other within the cross section.

3. The illumination apparatus according to claim 1, wherein the entrance surface of the light guide includes a flat surface portion whose plane normal is inclined with respect to the maximum intensity direction in light emission of the light source, and a curved surface portion whose plane normal continuously changes, and
   wherein a ray of light in the maximum intensity direction is refracted at the flat surface portion in a direction away from the fixing member.

4. The illumination apparatus according to claim 3, wherein the curved surface portion is positioned closer to the fixing member than the flat surface portion.

5. The illumination apparatus according to claim 1, wherein an area holding the light source in the holding member is bent with respect to an area holding the light guide in the holding member.

6. The illumination apparatus according to claim 1, wherein the light source includes a plurality of light emitting diodes arranged in a longitudinal direction thereof.

7. The illumination apparatus according to claim 1, wherein the light source includes a light emitting diode arranged only at an end of the light source in a longitudinal direction thereof.

8. An image reading apparatus comprising:
   an illumination apparatus including
   a light source,
   a light guide having an entrance surface on which a ray of light from the light source is incident and an exit surface from which a ray of light passing through the entrance surface exits toward a document, and
   a holding member configured to hold the light source and to hold the light guide via a fixing member,
   wherein an exit surface of the light source is perpendicular to a surface of the holding member contacting the light source, and
   wherein, within a cross section including a plane normal direction of the exit surface of the light source and a plane normal direction of the entrance surface of the light guide, the plane normal direction of the entrance surface of the light guide or a direction within a surface of the light guide contacting the fixing member and the plane direction of the exit surface of the light source or a maximum intensity direction in light emission of the light source are inclined relative to each other such that a ray of light from the light source in the maximum intensity direction is refracted at the entrance surface of the light guide in a direction away from the fixing member;
   an imaging optical system configured to collect a light flux reflected by a document surface of the document illuminated by the illumination apparatus; and
   a light receiving unit configured to receive a light flux from the imaging optical system.

* * * * *